(12) United States Patent
Sen

(10) Patent No.: US 7,076,549 B2
(45) Date of Patent: Jul. 11, 2006

(54) ELECTRONIC MAIL PROGRAM

(75) Inventor: Yafen Sen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 537 days.

(21) Appl. No.: 10/098,418

(22) Filed: Mar. 18, 2002

(65) Prior Publication Data

US 2002/0138585 A1 Sep. 26, 2002

(30) Foreign Application Priority Data

Mar. 26, 2001 (JP) ............................. 2001-088017

(51) Int. Cl.
*G06F 15/173* (2006.01)
*G06F 7/04* (2006.01)
(52) U.S. Cl. ......................................... 709/225; 726/4
(58) Field of Classification Search ................ 709/206, 709/209, 226, 225; 713/201, 200; 726/4, 726/5
See application file for complete search history.

(56) References Cited

U.S. PATENT DOCUMENTS

| | | | | |
|---|---|---|---|---|
| 5,675,782 A * | 10/1997 | Montague et al. | ............. | 726/4 |
| 5,832,208 A * | 11/1998 | Chen et al. | ................. | 713/201 |
| 6,457,044 B1 * | 9/2002 | IwaZaki | ..................... | 709/206 |
| 6,505,300 B1 * | 1/2003 | Chan et al. | ................. | 713/164 |
| 6,584,564 B1 * | 6/2003 | Olkin et al. | ................ | 713/152 |
| 6,889,210 B1 * | 5/2005 | Vainstein | ..................... | 705/57 |
| 6,944,772 B1 * | 9/2005 | Dozortsev | ................... | 713/187 |

OTHER PUBLICATIONS

OL2000: Developer Information About the Outlook E-mail Security Update (Q262701), Microsoft Outlook 2000, Jun. 24, 2000 (in both Japanese and English).

* cited by examiner

*Primary Examiner*—Larry Donaghue
(74) *Attorney, Agent, or Firm*—Staas & Halsey LLP

(57) ABSTRACT

An E-mail program according to the present invention can protect an existing file from the infection by computer virus, when a user receives an attached file sent from a transmitter through a communication network. In the present invention, an execution power for accessing another file of the attached file is set to a particular level. The E-mail program always checks the reference/overwrite to another file in which the attached file of the received mail intends to execute. When not-permitted process occurs in the attached file as a result of checking, the E-mail program informs it to a user. Further, the attached file, in which not-permitted process is found, is cancelled so that it is possible to avoid an accidental mistake, i.e., "accidental opening of the attached file without checking the infection of the computer virus", on the user side.

12 Claims, 11 Drawing Sheets

Fig.2

| EXECUTION INFORMATION | REFERENCE INFORMATION | UPDATE INFORMATION | |
|---|---|---|---|
| 3 | 3 | 3 | (DATA) |
| EXECUTION POWER OF THIS FILE FOR ANOTHER FILE | MINIMUM EXECUTION POWER OF ANOTHER FILE WHICH CAN REFER TO | MINIMUM EXECUTION POWER OF ANOTHER FILE WHICH CAN UPDATE | SUBSTANTIAL DATA |

| LEVEL | "STRONG" OR "WEAK" POWER |
|---|---|
| 3 — | HIGH |
| 2 — | MEDIUM |
| 1 — | LOW |

Fig.5

| DATE | RECEPTION FILE | SENDING SIDE | PROCESS ID | PROGRAM | EXISTING FILE | CONTENTS |
|---|---|---|---|---|---|---|
| 01/02/27/1944 | receive1.bas | frm01@foo.ne.jp | 0001 | BASIC | – | START |
| 01/02/27/1944 | receive1.bas | frm01@foo.ne.jp | 0001 | BASIC | exist01.jpg | REFERENCE |
| 01/02/27/1944 | receive1.bas | frm01@foo.ne.jp | 0001 | BASIC | exist01.jpg | ABNORMAL UPDATE 2 |
| 01/02/27/1945 | receive1.bas | frm01@foo.ne.jp | – | – | – | CHANGE OF POWER |
| 01/02/27/1945 | receive1.bas | frm01@foo.ne.jp | 0002 | BASIC | – | START |
| 01/02/27/1945 | receive1.bas | frm01@foo.ne.jp | 0002 | BASIC | exist01.jpg | REFERENCE |
| 01/02/27/1945 | receive1.bas | frm01@foo.ne.jp | 0002 | BASIC | exist01.jpg | UPDATE |
| 01/02/27/2000 | receive2.dat | frm02@foo.ne.jp | 0003 | SPREAD-SHEET | – | START |
| 01/02/27/2001 | receive2.dat | frm02@foo.ne.jp | 0003 | SPREAD-SHEET | exist02.dat | ABNORMAL UPDATE 2 |
| 01/02/27/2001 | receive2.dat | frm02@foo.ne.jp | – | – | – | PENDING |
| 01/02/27/2015 | receive3.doc | frm02@foo.ne.jp | 0004 | WORD PROCESSOR | – | START |
| 01/02/27/2016 | receive3.doc | frm03@foo.ne.jp | 0004 | WORD PROCESSOR | exist03.doc | ABNORMAL UPDATE 3 |
| 01/02/27/2016 | receive3.doc | frm03@foo.ne.jp | – | – | – | CANCEL |
| 01/02/28/0900 | receive4.dat | frm04@foo.ne.jp | 0005 | SPREAD-SHEET | exist04.dat | UPDATE |
| 01/02/28/1000 | receive5.bas | frm03@foo.ne.jp | – | – | – | AUTOMATIC CANCEL |

Fig.6

| REGISTERED DATE | SENDING SIDE | TIMES OF CANCEL |
|---|---|---|
| 01/02/15/1700 | frm99@foo.ne.jp | 6 |
| 01/02/20/1530 | frm00@foo.ne.jp | 1 |
| 01/02/27/2016 | frm03@foo.ne.jp | 2 |

Fig.7

| EXPANDING IDENTIFIER | START PROGRAM |
|---|---|
| .bas | Basic LANGUAGE INTERPRETER |
| .txt | TEXT EDITING SOFTWARE |
| .doc | WORD PROCESSOR SOFTWARE |
| .dat | SPREAD-SHEET SOFTWARE |

The received file "receive1.bas" from frm01@foo.ne.jp tries to update the existing file "Exist01.jpg" in the terminal, but the power is rejected so that the program is abnormally completed. The update level of the existing file is "2".
How to deal with the received file?

| CHANGE OF POWER and RE-EXECUTION | PENDING or CANCEL |

When the received file "receive2.dat" from frm02@foo.ne.jp is cancelled, and when the received mail of frm02@foo.ne.jp is automatically cancelled, "CANCEL" is selected.
When "PENDING" is selected, the file of "receive2.dat" is moved to the pending holder.

| CANCEL | PENDING |

The received mail from frm03@foo.ne.jp is automatically cancelled

The received file "receive1.bas" from frm01@foo.ne.jp refers to the existing file "Exist01.jpg"

The reception file "receive2.dat" from frm02@foo.ne.jp was not cancelled, and held in the pending holder.
Please care handling of the file

The reception file "receive3.doc" from frm03@foo.ne.jp was cancelled.
Hereinafter, the reception mail from frm03@foo.ne.jp is automatically cancelled at the time of reception.

OK

ELECTRONIC MAIL PROGRAM

BACKGROUND OF THE INVENTION

1. Field of the Invention

The present invention relates to an improved electronic mail (E-mail) program which can protect an existing file filed within a terminal equipment (e.g., a personal computer) or a computer system, from infection by a computer virus, when a user receives an attached file sent from a transmitter through a communication network.

2. Description of the Related Art

In general, there are two representative methods for protecting an existing file of the user from infection by a computer virus.

In a first method, the user confirms whether the received file is infected with a computer virus, using a predetermined virus-checking program which is provided separately from an E-mail program, before a user opens the received file.

In a second method, the E-mail program itself has a function for protecting the received file from the infection by the computer virus. For example, in a certain E-mail program, when a macro process is needed to execute the attached file, the macro process is invalided in accordance with a predetermined security level which is previously set by the user, or an alarm is displayed on a screen. In this case, the security level is defined by three levels, i.e., "high", "medium" and "low".

When the security level is "high", all macros, in which a digital signature by an original designer is not provided, are invalided. When the security level is "medium", an alarm message is displayed when the macro process is required by the attached file transmitted from a transmitter which has not registered in a list of transmitters. In this case, the transmitters are listed as the transmitters in which the macro process should be permitted. When the security level is "low", the macro process is always valid. As is obvious from the above, the feature of the second method lies in that an identity of a transmitter is considered and confirmed as a criterion of the above security level.

There is, however, a problem in each of the first and second methods, as explained below.

In the first method, i.e., use of the computer virus check program, a user may accidentally open the attached file without checking of the infection of the computer virus. In general, it is impossible to completely avoid this accidental mistake, i.e., "accidental opening of the attached file without checking the infection of the computer virus", in a user side.

In the second method, i.e., confirmation of the identity of the transmitter, much handling time is required for utilizing the digital signature. Further, it is very difficult to determine whether the user trusts the transmitter (i.e., whether such transmitter should be registered in the list of transmitter) in a network society, because almost all transmitters utilize anonymity when communicating with one another on the network.

Further, due to the contents of the macro process (for example, whether a file referred to, whether a file is overwritten, and the like), or in the case that the user wishes to determine go/no of execution of the macro process in accordance with a file to be objected by the macro process, it is impossible to avoid the infection by the computer virus even if the second method is used.

SUMMARY OF THE INVENTION

The object of the present invention is to provide an improved E-mail program which can protect an existing file from the infection by computer virus, when a user receives an attached file sent from a transmitter through a communication network.

That is, in the present invention, the E-mail program always checks the reference/overwrite to another file, in which the attached file of the received mail intends to execute. In this case, when the not-permitted process occurs in the attached file as a result of checking, the E-mail program informs it to the user.

Further, in the present invention, the attached file, in which a not-permitted process is found, is cancelled. As a result, it is possible to avoid an accidental mistake, i.e., "an accidental opening of the attached file without checking the infection of the computer virus", on the user side.

As explained in detail below, in the present invention, the E-mail program sets an access power information, which is positive and included in the received attached file in order to read from or write to another file, to a particular level regardless original level of the access power. Further, the E-mail program checks an error of an execution program which occurs, when the access power information of the received file is set to a level lower than that of a passive access power information which is attached to another file in order to permit read from or write thereto. As a result of checking, when the E-mail program detects an error of the execution program, the E-mail program cancels the received attached file.

Further, in the present invention, not only the E-mail program cancels the attached file, but also the E-mail program can change a level of the access power of the attached file or can move the attached file to another different directory which is not used in a normal operation without cancellation of the attached file.

BRIEF DESCRIPTION OF THE DRAWINGS

FIG. 2 is a structural view of an access power information attached to a file;

FIG. 6 is a view of a file explaining a cancel list;

FIG. 7 is a view of a file explaining a relationship between an expanding identifier and an execution program;

FIG. 8 is a view for explaining a selection display at abnormal finish of the execution program;

FIG. 9 is a view for explaining the selection display to select either cancel or pending of the attached file;

FIG. 10 is a view for explaining a display indicating a result of an automatic cancellation;

FIG. 11 is a view for explaining a display indicating a result of a normal process;

FIG. 12 is a view for explaining a display indicating a result of a pending process; and FIG. 13 is a view for explaining a display indicating a result of a cancel process.

DESCRIPTION OF THE PREFERRED EMBODIMENTS

A preferred embodiment of the present invention will be explained in detail with reference to the drawings below.

Figure 1A:
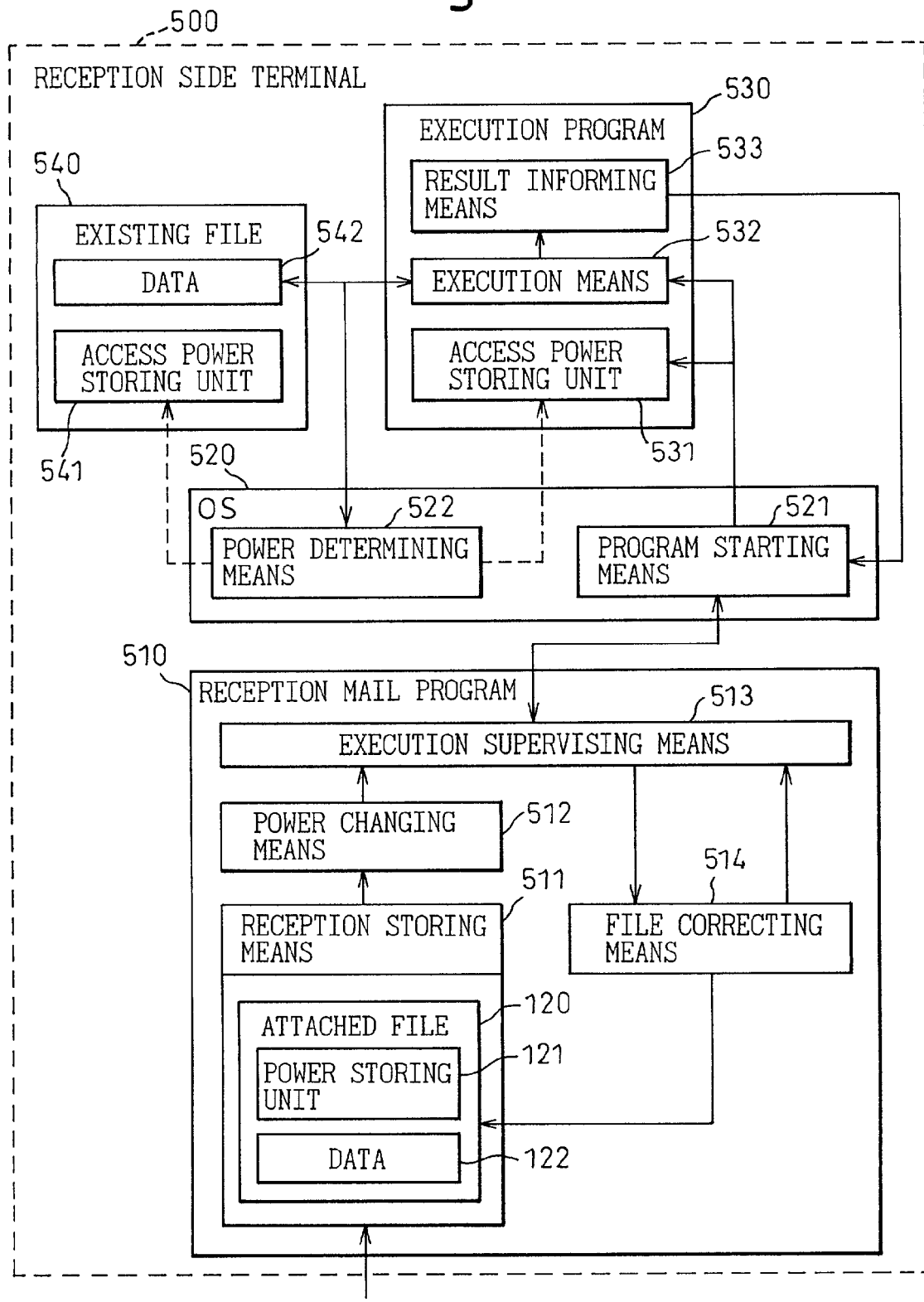
FIGS. 1A and 1B are structural views of an E-mail program according to an embodiment of the present invention.
Figure 1B:
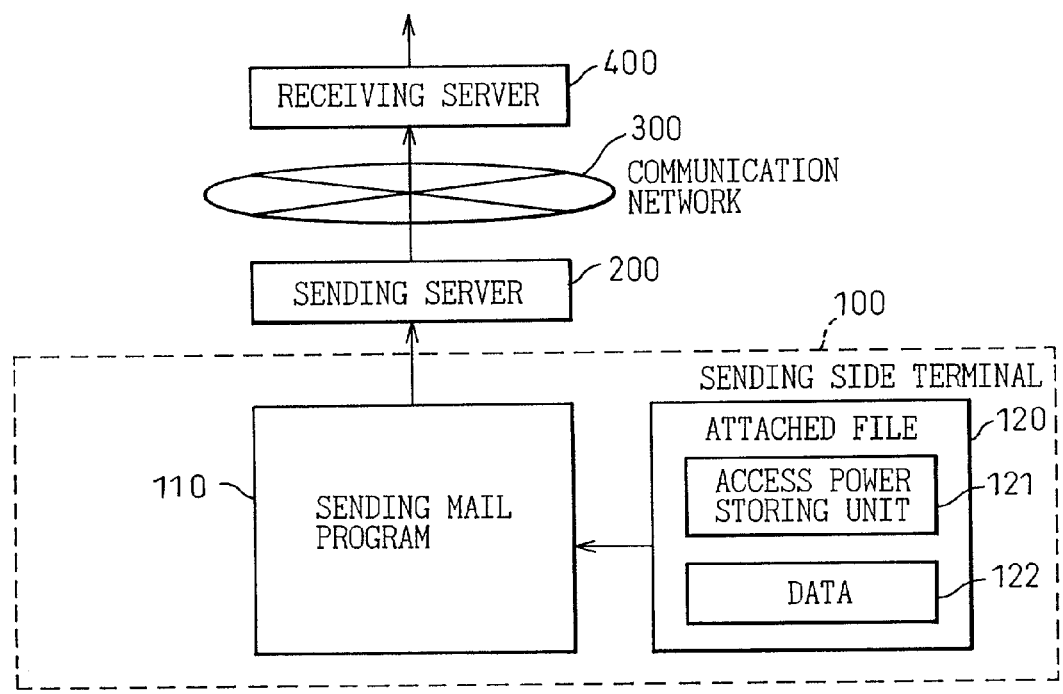

FIGS. 1A and 1B are structural views of an E-mail program according to an embodiment of the present invention. In FIGS. 1A and 1B, a sending side terminal 100 includes a sending mail program 110 for preparing an E-mail and sending it. An attached file 120 is an existing file simultaneously sent with the E-mail. The attached file 120 includes data 122 as a body and an access power storing unit 121 for storing levels of positive access power and passive access power.

A sending server 200, a network 300, and a receiving server 400 are network systems for sending the E-mail and the attached file 120, these being prepared in the sending side terminal 100, to a receiving side terminal 500.

In the reception side terminal 500, a reception mail program 510 includes a reception storing means 511 for receiving and storing the E-mail and the attached file 120; a power changing means 512 for changing access power levels set in the power storing means 121 of the attached file 120 to particular values; an execution supervising means 513 requesting execution of the attached file to a program starting means 521 of an OS 520, and receiving a process ID of the execution process of the program and a result of process of the execution program from the program starting means 521, and informing them to a user; and a file correcting means 514 for moving the attached file to each holder of cancel/change of power/pending in accordance with process error detected by the execution supervising means 513.

The operating system (OS) 520 includes a power determining means 522 and the program starting means 521. The program starting means 521 prepares a new process in accordance with a request from the execution means supervising means 513 of the reception mail program, starts the execution program 530 related to the expanding identifier of the attached file 120 in accordance with a file related to the expanding identifier in FIG. 7, and stores access power levels stored in the power storing unit 121 of the attached file 120 to the power storing unit 531 of the execution program 530. The program starting means 521 delivers the process ID of the program for the execution supervising means 513 of the reception mail program 510, receives a result of process tried from the execution program 530 to the existing file 540, from a result informing means 533, and passes its information to the execution supervising means 513. The power determining means 522 compares power levels stored in the power storing unit 531 with power levels stored in the power storing unit 541, and informs the result to the execution means 532, when the execution program 530 tries various processes to data 542 of the existing file 540.

The execution program 530 includes the power storing unit 531 for storing power levels informed by the program starting means 521 at the starting time, the execution means 532 for executing various processes, and the result informing means 533 for informing the result of process in the execution means 532 to the program starting means 521. The execution means determines whether the processes are actually executed based on the result of process informed by the power determining means 522 of the OS 520, when the execution means 532 executes various processes to the existing file 540.

The existing file 540 includes the data 542 and the power storing unit 541 in which the levels of positive and passive access power information.

FIG. 2 is a structural view of an access power information attached to a file. As shown in FIG. 2, the access power information is attached to all files. The power information is set by the program upon preparing the file, and is determined in each process item, i.e., execution information/reference information/update information.

The execution information includes an positive access power information, and represents the execution power level of this file for another file. The reference information is a passive power information and represents minimum execution power level of another file which can refer to this file. The update information is the passive power information and represents minimum execution power level of another file which can update (overwrite) this file. The grade of the power level of each information of execution/reference/update is defined by numerical values from 1 to 3 (high, medium, low) as shown in the drawing.

For example, when this file refers to another file, the power determining means 522 of the OS 520 compares the execution power level (actually, the execution power level stored in the power storing unit 531 of the execution program handed over from the execution power level of this file) with the power level of the reference information of another file. As a result of comparison, when the execution power level of this file is equal to or higher than the power level of the reference information of another file, this file can refer to another file. On the contrary, when the execution power level of this file is equal to or lower than the power level of the reference information of another file, this file cannot refer to another file, and the execution program 530 abnormally completes at that time.

FIGS. 3A and 3B are process flowcharts of the E-mail program according to the embodiment of the present invention. These flowcharts represent processes from reception of a new E-mail and an attached file 120 until the final process of the attached file 120 executed in these steps when the reception mail program 510 has been already started.

The E-mail and attached file 120 sent from the sending side terminal 100 are received by the reception storing means 511 of the reception mail program 510 and are stored therein (S100). At that time, the reception mail program 510 determines whether the E-mail address of the sending side is described or not in a cancel list (a list for indicating mail addresses which should be canceled) (S101). The cancel list registers the sending side mail address, in which the reception mail program 510 has previously canceled the file. As shown in FIG. 6, the date of registration, the mail address of the sending side, and times of cancellation at the present time are described in this list.

Further, when the present sending mail address exists in this cancel list, the reception mail and the attached file are cancelled (S102). When canceling, times of cancellation of the sending side in the cancel list is counted-up, and the cancellation is automatically recorded in a log file and displayed as shown in FIG. 10.

When the sending side mail address does not exist in the cancel list, the power change means 512 sets all power levels included in the power storing unit 121 of the attached file 120 to the minimum level (S103).

Figure 4:
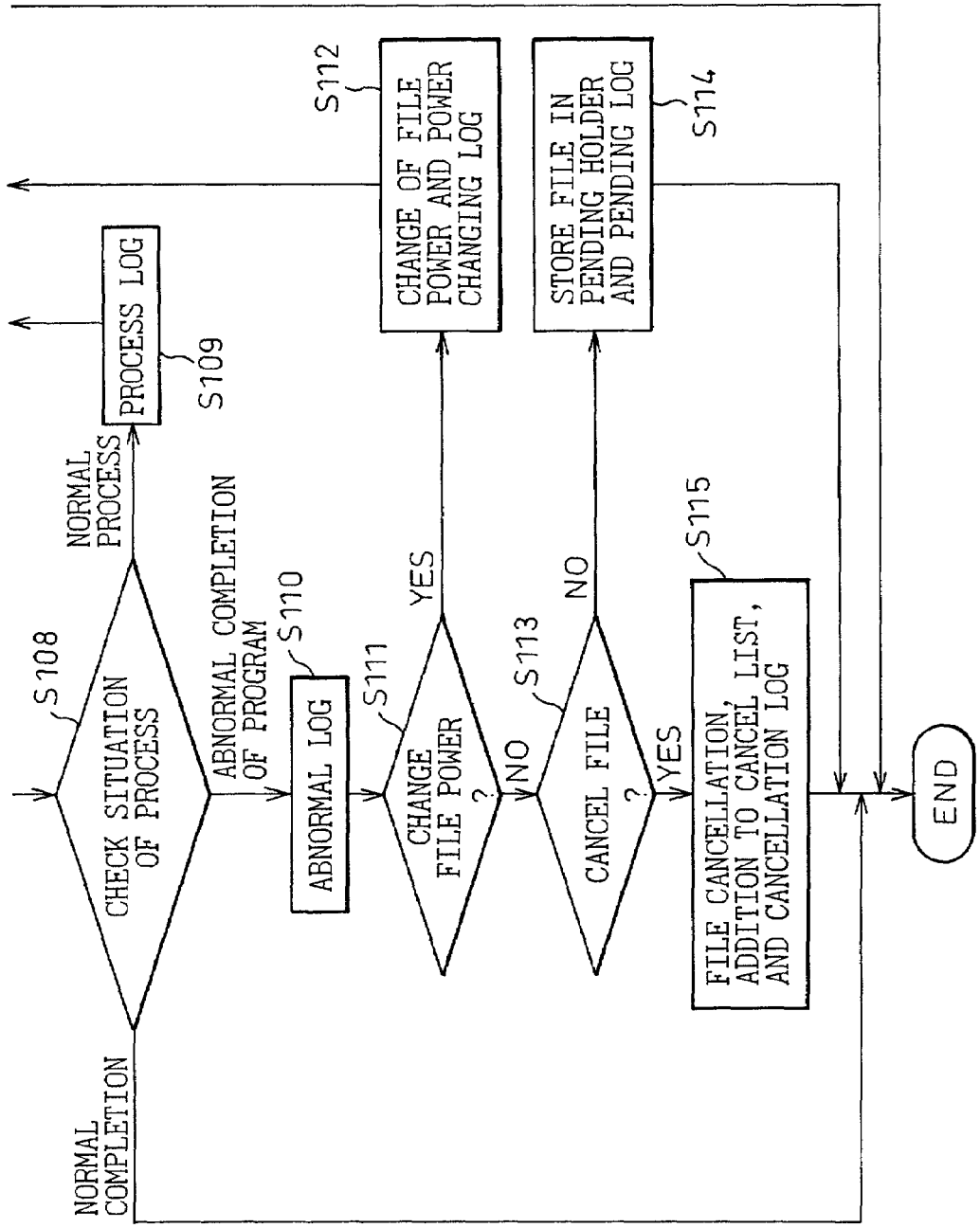
FIG. 4 is a view for explaining change of the access power information of the file.

FIG. 4 is a view for explaining change of the access power information of the file. The step S103 corresponds to the "3. change of power" in FIG. 4.

After this, the power change means 512 determines whether the currently received E-mail should be added to the mail reception list, or displays the reception message and waits for an open instruction to execute the attached file 120 sent from the user (S104).

The execution supervising means 513 receives the open instruction for executing the attached file 120 from the user, and requests execution of the attached file 120 to the program starting means 521 of the OS 520. Further, the execution supervising means 513 requests sending of a notice of result of processes which occur hereafter, from the execution program 530 to the existing file 540 (S105).

The program starting means 521 searches for the execution program 530 related to the attached file 120, and starts that execution program 530. At the same time, the program starting means 521 reads the access power level stored in the power storing unit 121 of the attached file 120, and sets the same power level to the power storing unit 531 of the execution program 530. When starting the execution program, the program starting means 521 prepares a process ID for identifying sequential processes of the execution program hereafter, and informs the name of execution program and the process ID to the execution supervising means 513 of the reception mail program 510.

As explained above, the execution supervising means 513 receives the name of execution program and the process ID, and records the contents of the start into the log file (S106). The contents of the start of the log file correspond to "start" in FIG. 5 which shows a log file.

When the execution program 530 starts the execution means 532, the execution means 532 reads the attached file 120 and executes a predetermined process. At that time, the execution means 532 tries to access the existing file 540 and to read from or write to the exiting file 540. At that time, the execution means 532 requests the process to the OS 520. The power determining means 522 of the OS 520 compares the execution power level of the power storing unit 531 of the execution program 530 with the reference information of power level or the update information of power level, and informs yes/no for the execution to the execution means 532. The execution means 532 executes the process to the existing file 540 based on this information. If the execution means 532 cannot execute the process, the execution program 530 is abnormally finished.

In the case of "4. request of reference" in FIG. 4, the execution power level of the attached file is "1". On the other hand, since the reference information of power level in the existing file is also "1", both power levels correspond to each other, the power determining means 522 informs an executable notice to the execution means 532. The execution means 532 which received the executable notice executes the process.

Further, in the case of "5. request of update" in FIG. 4, the execution power level of the attached file is "1". On the other hand, the updated level of the exiting file is "2" so that the attached file does not reach an executable power level. Accordingly, the power determining means 522 informs an unexecutable notice to the execution means 532. When the execution means 532 does not execute the process, the process is abnormally finished.

The result informing means 533 always informs current situation of process sent from the execution means 532 to the program starting means 521 of the OS 520. The program starting means 521 returns situation of process for the existing file with the process ID to the execution supervising means 513 of the reception mail program 510.

The information of the situation of process for the existing file includes the name of file of the existing file 540, the contents of request of process, the result of process, and the passive power level of the existing file 540 corresponding to the process.

The execution supervising means 513 of the reception mail program 510 receives situation of process of the execution program 530 from the OS 520 (S107), identifies the contents (S108), and executes processes in accordance with the result of the contents determined. The identification of situation of process includes a normal completion of the execution program 530, a normal process for the existing file 540, and an abnormal completion of the execution program 530 due to the power being not qualified to process the existing file.

In the normal completion of the program, the process flow is completed without any execution. In this case, the attached file 120 is held into an area at the time of reception thereof, i.e., a reception directory set to "default".

When the access for the existing file 540 is normally completed, the execution supervising means 513 records it in the log file, and displays the contents shown in FIG. 11 (S109). Further, the process returns to step 107, and the execution supervising means 513 waits for reception of next situation of process. The contents of log file at that time corresponds to "reference" or "update" in FIG. 5.

In the abnormal completion of the program due to the power being not qualified to process the existing file, the following processes are executed. First, the execution supervising means 513 records the abnormal completion in the log file (S110), and informs the abnormal completion due to the power being not qualified by indicating the contents of FIG. 8 to the user. At the same time, the execution supervising means 513 changes the power level of the attached file 120 to the executable level, and executes the process again. In another case, when the execution supervising means 513 does not execute the process, the execution supervising means 513 urges selection of either cancel of the file or pending of the file (S111).

When re-execution due to change of access power is selected, the file correcting means 514 changes the execution level of the attached file 120 to the passive access power level of the objected existing file 540, and records the change of access power in the log (S112). Further, the process returns to the step S105, and requests again execution of the attached file to the OS 520. The processes from "6. change of power" until "8. completion" in FIG. 4 represent situation of power in the above steps. Further, the record corresponding to "change of access power" in FIG. 5 corresponds to the change of power in the log file.

In step S111, the user selects cancellation or pending of the attached file 120, the file correcting means 514 displays the contents of FIG. 9, and urges the user so as to indicate either cancellation or pending (S113) of the attached file.

When receiving instruction of cancellation, the file correcting means 514 cancels the attached file 120 from the reception side terminal 500. At that time, the file correcting means 514 registers the sending side mail address into the cancel list, records the contents of cancellation into the log file, and displays the contents of FIG. 13 (S115). As mentioned above, sequential processes are completed. The log of cancellation corresponds to the record indicated by "cancel" in FIG. 5.

When registering the sending side mail address into the cancel list, if the sending side address is new, the item of cancel times in FIG. 6 is set to "1". After the registration, as shown in steps S101 to S102, the E-mail and attached file sent from the same sending side mail address are automatically canceled hereafter.

On the other hand, when receiving the instruction of pending in step S113, the file correction means 514 moves the attached file from the reception directory of the default initially held to the pending directory provided for holding only pending attached file, records in the log file and displays the contents of FIG. 12 (S114). As a result, sequential processes are completed. The pending log corresponds to the record described as "pending" of FIG. 5.

Figure 3:
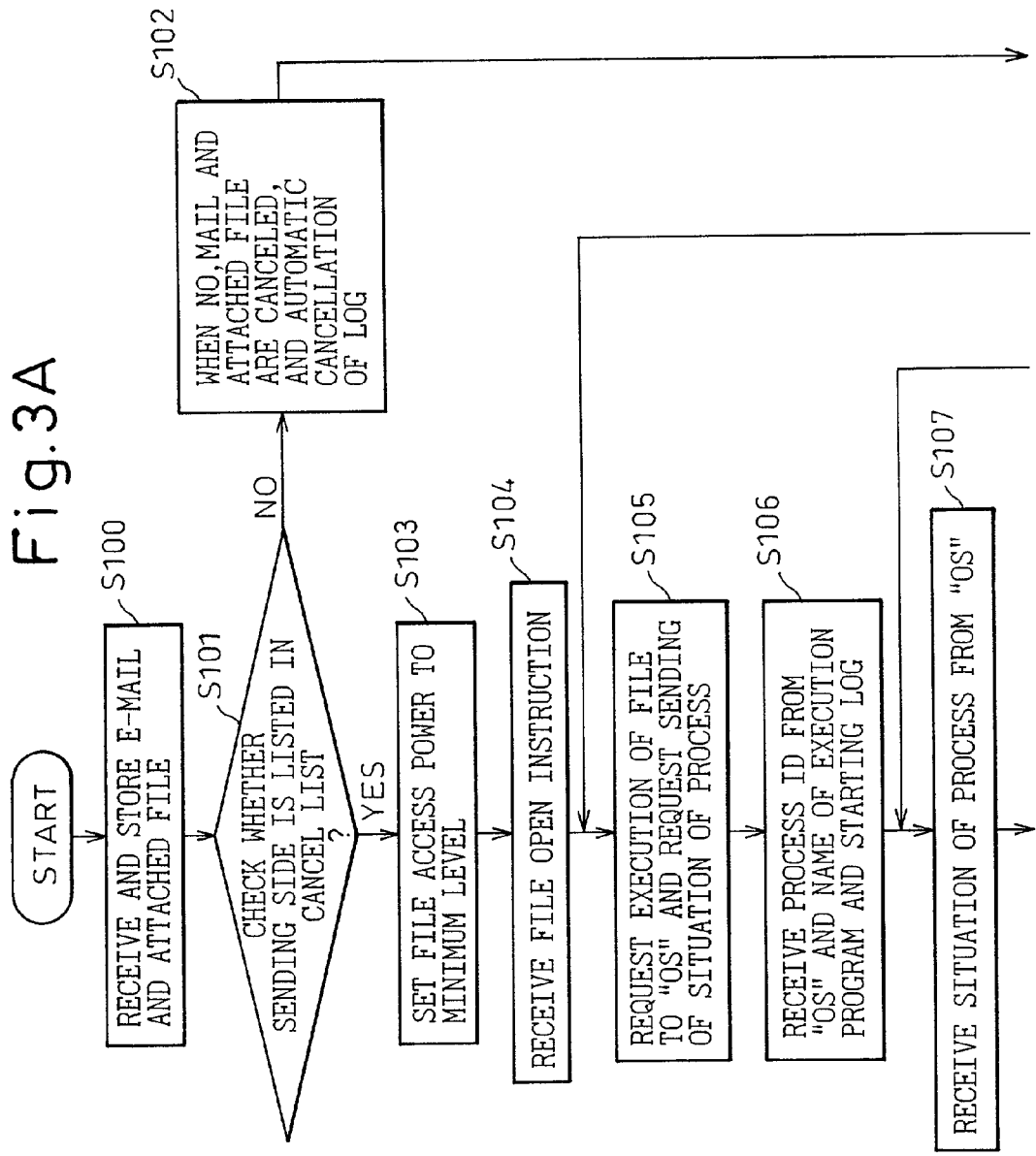
FIGS. 3A and 3B are process flowcharts of the E-mail program according to the embodiment of the present invention.

The processes shown in FIG. 3 are explained above. However, the reception mail program 510 itself does not complete at the time completion of processes mentioned above. In this case, the reception mail program 510 waits for reception of a new mail, and repeats the above processes when receiving the new mail. Further, after completion of the above processes, the process returns to the step S104, the reception mail program 510 displays the mail reception list and waits for selection and execution of another attached file by the user.

FIG. 4 is a view for explaining change of the power information of the attached file 120 and the existing file 540. In the example of FIG. 4, the reception mail program 510 executes the attached file which was not automatically cancelled. This assumes that the reception mail program 510 once refers to the existing file 540, but fails to update the same file hereafter, further, the execution program is abnormally completed so that the user selects re-execution due to change of power.

Figure 5:
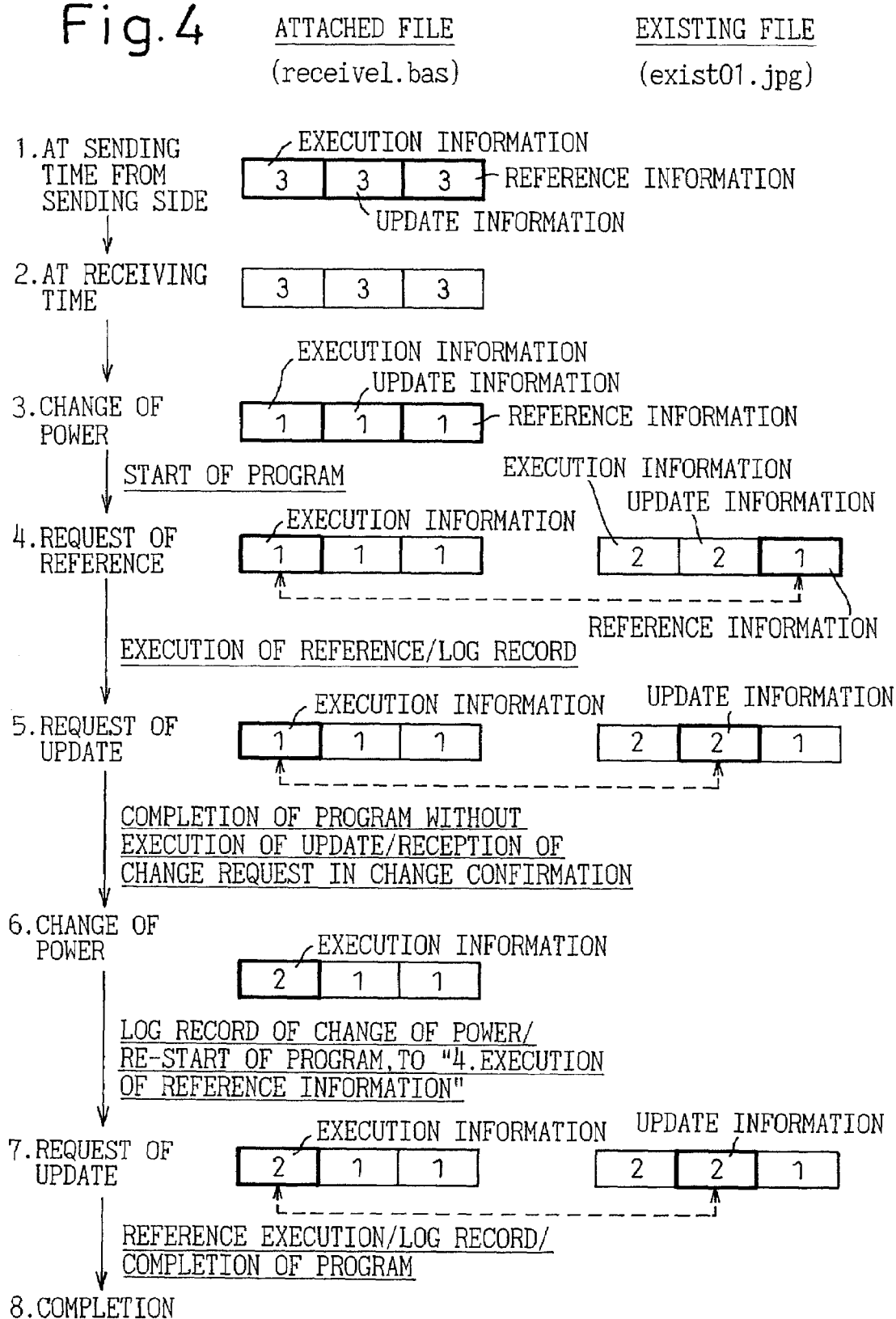
FIG. 5 is a view of a log file.

FIG. 5 is a view of a log file. The log file includes various dates at the time when the execution supervising means 513 receives situation of process in which the execution program 530 has executed in the existing file 540; various names of the attached file 120 which becomes a starting point of the execution of the program; various sending side mail addresses; various process IDs; various names of programs of the execution program 530; various names of the existing file 540 in which the execution program tries to process; and the result of processes and contents of process in which the reception mail program 510 executed.

In the log of automatic cancel and change of power in FIG. 5, the execution program 530 does not start. Accordingly, the process ID, the name of execution and the name of the existing file are shown by blanks. In the log of the start, only the execution program 530 starts, and the process is not executed to any existing file 540. Accordingly, the name of the existing file is shown by the blank. The passive access power level of the objected existing file when occurring abnormal state, is recorded in the item of the contents of records of abnormal of reference and abnormal of update. For example, sequential records in which the item of the reception file is "receive 1.bas" represent the log records corresponding to the processes of FIG. 4.

FIG. 6 is a view of a file explaining a cancel list. In FIG. 6, although cancel times of frm03@foo.ne.jp of the sending side is "2", this means that, in the log file of FIG. 5, first, it was canceled by the selection instruction of the user at 20:16 on Feb. 27, 2001, and second, it was automatically canceled at 10:00 on Feb. 28, 2001.

FIG. 7 is a view of a file explaining a relationship between an expanding identifier and an execution (starting) program. The user can optionally set and change the relationship. In FIG. 7, ".bas" is a basic language interpreter, ".txt" is a text editing software, ".doc" is a word processor software, and ".dat" is a spread-sheet software.

FIGS. 8 to 13 show the contents of various displays, and correspond to the contents of the log file of FIG. 5. In another embodiment of the present invention, in step S108 of FIG. 3, when the execution supervising means 513 of the reception mail program 510 detects abnormal completion of program due to the power being not qualified, the execution supervising means 513 does not execute re-execution process due to change of power, and cancels automatically the attached file 120. In still another embodiment, in step S108, the execution supervising means 513 detects abnormal completion of program, the execution supervising means makes selection of cancellation or pending by the user.

Further, in the present embodiment, the power determining means 522 determines the access power for the file in accordance with the grade of the power (three grades 1 to 3) for each items of execution information/reference information/update information, as shown in FIG. 2. However, this setting method is merely one example and the method is not limited to this. As still another embodiment, for example, there is a method of setting the grade by two values, i.e., the process being executable, or the process being unexecutable. Further, as still another embodiment, there is a method of setting "yes" or "no" for execution for each item by adding identifying information relevant to file-handling operators, for example, particular operator, particular group, and others.

Further, in the present embodiment, as shown in FIG. 4, when receiving the attached file 120, the power changing means 512 sets the access power information to the lowest level for all items of execution information/reference information/update information. However, this setting method is merely one example and the method is not limited to this. As still another embodiment, since the access is not executed for the existing file 540 of the reception side terminal, only the execution power level of the attached file 120 is set to the lowest level, and other passive power levels are not changed.

Still further, in the present embodiment, as shown in FIG. 4, when the attached file 120 is transmitted through the communication network 300, the access power information, which was set in the sending side terminal 100, is also transmitted to the reception side terminal 500. However, this method is merely one example. As another embodiment, when transmitting the attached file 120, it may be possible to only transmit data 122 of the attached file 120. In this case, when the reception mail program 510 receives the attached file 120, the access power changing unit 512 newly determines the power level to each item of the access power information as the access power information does not exist in the power storing unit 121.

The invention claimed is:

1. A computer executing an electronic mail (E-mail) program, comprising:

a reception storing unit receiving an E-mail with an attached file from a communication network, and storing the attached file as a part of the E-mail;

a power changing unit setting access power information, referred to when the attached file accesses another file, and forcibly setting a selected file access power level into the file access power information of an attached file, the file access power information having a plurality of selectable file access power levels;

a comparison unit comparing the selected file access power level with a file access power level defined in the file access power information assigned to the other file, to determine whether to permit the attached file to access the other file; and an execution supervising unit supervising an access error caused by the comparison of the respective file access power information, executing a predetermined error process when the access error is detected, and informing a user of the access error.

2. An electronic mail program as claimed in claim 1, further comprising a file correction means for canceling the received file in which the error occurs.

3. An electronic mail program as claimed in claim 1, further comprising a file correction means for changing again the access power information of the received file in which the error occurs.

4. An electronic mail program as claimed in claim 1, further comprising a file correction means for moving the received file in which the error occurs, to a holding area where it is not usually used.

5. The electronic mail program as claimed in claim 1, wherein the selected file access power level forcibly set by the power changing unit is the lowest file access power level.

6. A computer readable storage medium storing an E-mail program and controlling a computer, comprising:
   receiving an E-mail with an attached file from a communication network, and storing the attached file as a part of the E-mail;
   setting access power information, referred to when the attached file accesses another file, and forcibly setting a selected file access power level into the file access power information of an attached file, the file access power information having a plurality of selectable file access power levels;
   comparing the selected file access power level with a file access power level defined in the file access power information assigned to the other file, to determine whether to permit the attached file to access the other file; and
   supervising an access error caused by the comparison of the respective file access power information, executing a predetermined error process when the access error is detected, and informing a user of the access error.

7. A computer readable storage medium as claimed in claim 6, further comprising recording an E-mail program making a computer execute canceling the received file in which the error occurs.

8. A computer readable storage medium as claimed in claim 6, further comprising recording an E-mail program making a computer execute changing the access power information of the received file in which the error occurs.

9. A computer readable storage medium as claimed in claim 6, further comprising recording an E-mail program making a computer execute moving the received file in which the error occurs, to a holding area where it is not usually used.

10. The computer readable storage medium as claimed in claim 6, wherein the selected file access power level forcibly set is the lowest file access power level.

11. A method, comprising:
    receiving an E-mail with an attached file from a communication network, and storing the attached file as a part of the E-mail;
    setting file access power information, referred to when the attached file accesses another file;
    forcibly setting a selected file access power level into the file access power information of an attached file, the file access power information having a plurality of selectable file access power levels;
    comparing the selected file access power level with a file access power level defined in the file access power information assigned to the other file, to determine whether to permit the attached file to access the other file; and
    supervising an access error caused by the comparison of the respective file access power information, executing a predetermined error process when the access error is detected, and informing a user of the access error.

12. The method of claim 11, wherein the forcibly set selected file access power level is the lowest file access power level.

* * * * *